March 9, 1965 C. F. HAZZARD 3,172,327
DIE FOR TRIMMING CAST AND MOLDED OBJECTS HAVING
A THREE-DIMENSIONAL TRIM-LINE
Filed Sept. 13, 1960 2 Sheets-Sheet 1
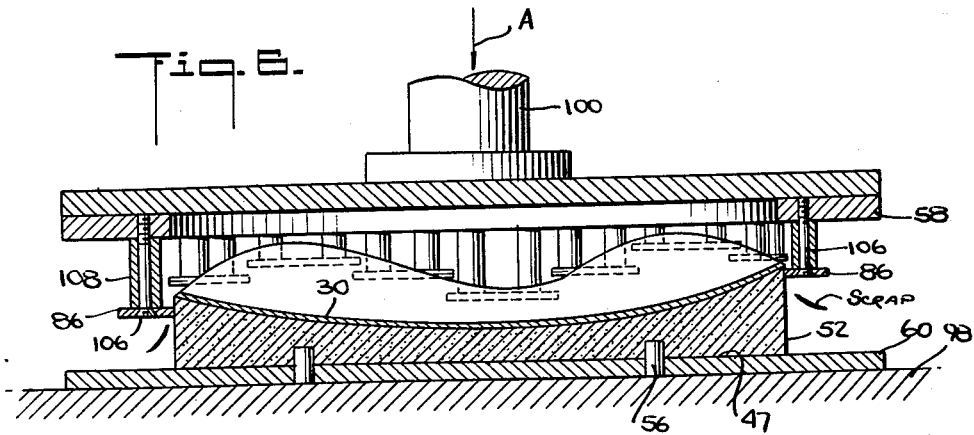
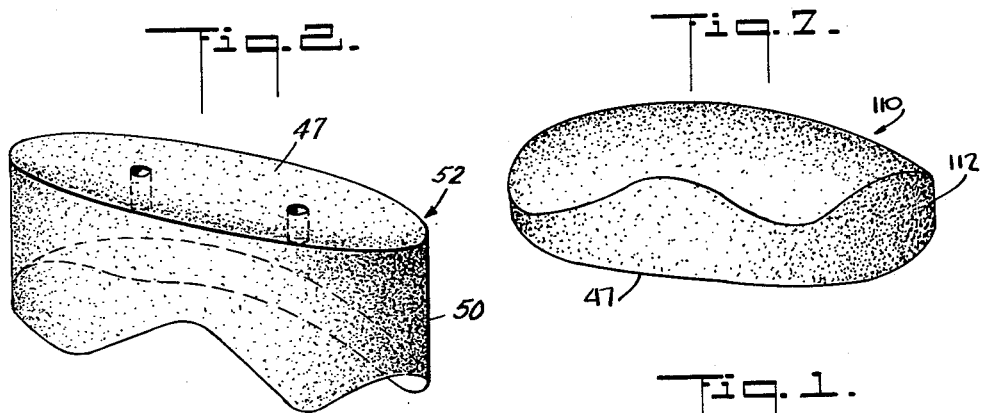
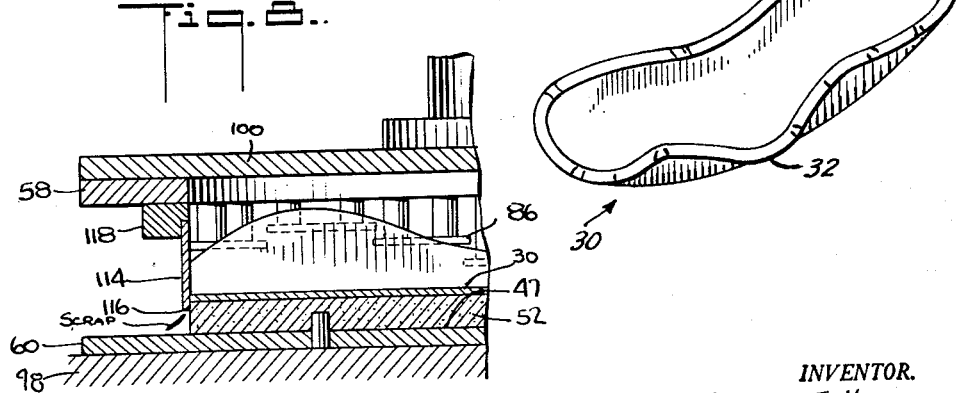
INVENTOR.
CHARLES F. HAZZARD
BY
ATTORNEYS March 9, 1965 C. F. HAZZARD 3,172,327
DIE FOR TRIMMING CAST AND MOLDED OBJECTS HAVING
A THREE-DIMENSIONAL TRIM-LINE
Filed Sept. 13, 1960 2 Sheets-Sheet 2
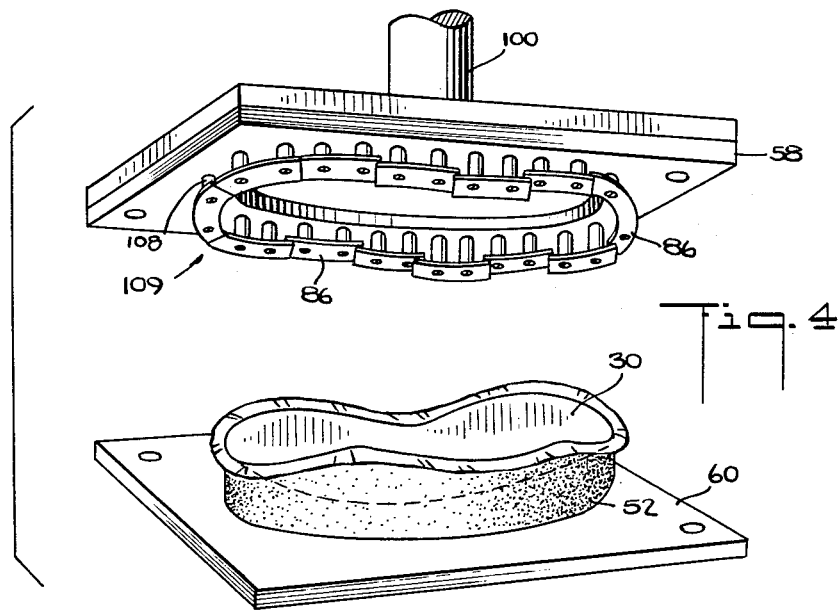
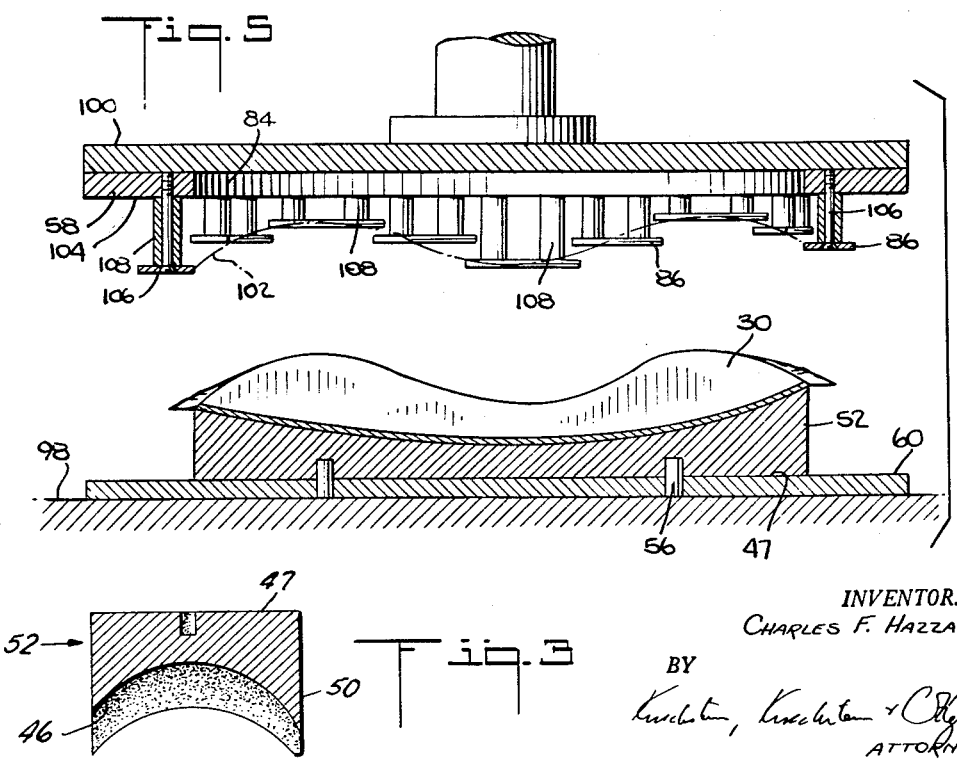
INVENTOR.
CHARLES F. HAZZARD
BY
ATTORNEYS

United States Patent Office 3,172,327
Patented Mar. 9, 1965

3,172,327
DIE FOR TRIMMING CAST AND MOLDED OBJECTS HAVING A THREE-DIMENSIONAL TRIM-LINE
Charles F. Hazzard, East Northport, N.Y., assignor to Templet Industries, Inc., Brooklyn, N.Y., a corporation of New York
Filed Sept. 13, 1960, Ser. No. 55,799
10 Claims. (Cl. 83—690)

This invention relates to a die for trimming cast and molded objects having a three-dimensional (non-planar) trim-line.

It is the custom today in mass production industries to make parts by filling a mold cavity with a settable (hardenable) fluid material. For instance objects are made in such manner by injection molding, compression molding and transfer molding of synthetic plastic materials, both thermoplastic and thermosetting, objects also are made in this fashion by die-casting, conventionally with a zinc alloy. This method of fabrication by molding ("molding" includes "casting") has come into widespread use and is not confined to the molding of simple objects. It is accepted practice at the present time to mold parts of extremely complex shapes and to mold them to very close dimensional tolerances with good smooth surfaces as originally removed from the molds thereby to minimize subsequent operations upon the parts. The molds which define the cavities within which the objects are hardened ordinarily are made of two or more pieces and it is normal for some of the liquid material that is introduced into the molds to escape, i.e. to be squeezed, into the cracks between the pieces of the molds. The liquid material is introduced into the molds at very high pressures and a considerable amount thereof is squeezed out between the mold parts. In a casting or molding machine this extruded material hardens into a solid very thin fin which is generally referred to as "flash" and which must be trimmed away before the part can be used. At present the flash is removed by hand-filling or grinding or by the use of trimming dies.

Due to the complex shapes of the great number of parts that now are cast or molded the trim is not a coplanar element, that is to say it does not lie in a single plane but, rather, is three-dimensional in configuration. Due to this intricate shape trim dies are very costly to make and, indeed, sometimes approach the cost of a die which would otherwise be used to make the part from sheet metal. The cost of such a die heretofore has been in direct proportion to the difficulty involved in designing and constructing the cutting edge of the tool in such a manner as to accurately follow the trim line. Hence, until now, the trimming expense has been a major limiting factor in the mold casting and, particularly, in the die casting of complex shapes.

It is an object of the present invention to provide a three-dimensional trimming die which is radically unconventional and extremely simple to use.

More particularly it is an object of the invention to provide an apparatus of the character described which can be fabricated quickly but accurately and at a low cost.

It is another object of the invention to provide a three-dimensional flash trim die of the character described which utilizes inexpensive and simple individually plane trimming elements that are mutually arranged to create a desired three-dimensional trimming.

It is another object of the invention to provide a three-dimensional trimming die of the character described which performs its operation on a three-dimensional flash in incremental steps simultaneously at a plurality of points distributed around an object.

Other objects of this invention in part will be obvious and in part will be pointed out hereinafter.

The invention accordingly consists in the features of construction, combinations of elements and arrangements of parts which will be exemplified in the construction hereinafter described, and of which the scope of application will be indicated in the appended claims.

In the accompanying drawings, in which are shown various possible embodiments of this invention, FIG. 1 is a perspective view of an untrimmed die cast object having a three-dimensional flash which is adapted to be cut off by a three-dimensional trimming die embodying and constructed in accordance with the instant invention;

FIG. 2 is a perspective view of a trimming die-nest apertured to receive pins;

FIG. 3 is a transverse cross-sectional view of the trimming die-nest;

FIG. 4 is a perspective view of a three-dimensional flash trimming die constructed in accordance with the present invention, the same being illustrated in open position;

FIG. 5 is a vertical sectional view through said open die;

FIG. 6 is a view similar to FIG. 5, but showing the die almost fully closed;

FIG. 7 is a perspective view of a matrix having a shape that is the reverse of that illustrated in FIG. 2; and FIG. 8 is a fragmentary view similar to FIG. 6 of a die embodying a modified form of the invention wherein in a vertical shear blade is used in lieu of one or more lamellae.

Referring now in detail to the drawings, the reference numeral 30 denotes a molded object which has been made by a hardenable material which was fluid when injected into the mold under pressure. Specifically, the object 30 is a die-cast object. Instead of showing a highly complex shape, for the purpose of simplicity the object 30 has been illustrated as in the approximate shape of a gravy boat with a rim which is irregular in plan and irregular in elevational profile. Said object was made in a mold consisting of two mold parts which were separated along a line following the irregular rim of the object and, therefore, the object as die cast, i.e. as it came from the die casting mold, had a fin or flash 32 which is a thin flange of excess metal that was forced out of the mold cavity in the region of separation of the mold parts and which must, if the object 30 is to be used, be trimmed away precisely and cleanly at the rim of the object. This trimming operation should preferably be such as to remove the flash exactly to the rim so that no further finishing operations will be required, such for instance as tumbling, filing, grinding, or wire brushing.

I provide a trimming die-nest 52 which would, if inverted (turned upside down so that the die-nest cavity 46 would be uppermost), present a surface which is configured to exactly receive the matching surface of the mass-produced object 30 with the flash trim line of the object precisely matching the periphery of the die-nest 52. The side wall 50 of the die-nest is precisely perpendicular to the reference surface 47. The appearance of the trimming die-nest in inverted position is shown in FIG. 2 in which the plane projected shape of the object and, therefore, of the flash trim line, clearly can be seen as constituting the profile of the reference surface 47. Said die-nest includes protruding registering dowel pins 56 (see FIG. 5) that are perpendicular to said reference surface 47.

In the operation of the invention a set number of comparatively small flat plates 86 are required, these being referred to herein as lamellae. By "small" it is meant that the length and width of each lamella is small in comparison to the length of the periphery of the opening 84 which is provided in the upper die plate 58, said opening being a true replica of the plane projection of the trim-line of the object. In a typical flash trimming die embodying the present invention the length of a lamella may vary from as little as about one inch to as much as about one foot, it being understood that the object from which flash is to be trimmed may vary widely in size. My invention can be used to trim objects which may be as short as a few inches and as narrow as about one-half an inch and as long or as wide as several feet, e.g. an automotive bumper or an airplane spar.

The lamellae 86 are made of tool steel, that is to say of a material having a good durability and which can provide a cutting edge that is capable of holding its cutting ability over long periods of time. A satisfactory metal for example is a high carbon steel or any of the many known types of cutting steel alloys.

The thickness of the lamellae will depend upon the material of which the object 30 is made and of the thickness of the flash. Conventionally the flash is very thin and the material of the object is comparatively soft in relation to tool steel so that the lamellae can be quite thin. A satisfactory thickness for instance, for the plane lamellae is 0.1″. However, this is mentioned simply as an example and is not to be construed as a limitation.

The lamellae are of a shape such that if laid in succession on the upper surface of the die plate 58 in juxtaposition or in slightly over-lapping relationship their inner edges will follow the contour of the opening 84, i.e. define a path which follows said contour.

The upper die plate 58 is secured to the ram 100 of a press. The trimming die-nest 52 is mounted on the lower die plate 60 where it is held in registration by the pins 46. Said lower die plate is secured to the bed 98 of the press. The lamellae 86 are mounted on the lower surface 104 of the upper die plate 58 as by bolts 106 which are designed to engage the openings 92 in said upper die plate. For convenience, the openings 92 may be tapped to receive said bolts. The lamellae are displaced vertically desired distances from the lower surface 104 of the upper die plate 58 by spacers 108 around the bolts 106. These distances are such that each horizontal lamella is located with the approximate center of its cutting edge (inner periphery) on the flash trim-line. All the spacers 108 associated with each individual lamella are of the same length so that each lamella is substantially parallel to the upper and lower die plates and to the reference surface 47 which now is the base of the trimming die-nest. This exact parallelism is however not absolutely essential for satisfactory operation.

It now will be appreciated that with all the lamellae thus positioned they conjointly define what resembles a roller-coaster track. That is to say, the lamellae when viewed in plan conjointly define a path the inner periphery of which forms an opening that exactly matches the opening 84 as well as the plan configuration of the flash trim line (except for clearance if any). The lamellae, moreover, are staggered in height to, in effect, match the variation in height i.e. the elevational profile of the contour of the flash trim line. The edges of the lamellae are slightly overlapped to insure complete trimming, this overlapping being created without interference due to the successively different heights of adjacent lamellae. If adjacent lamellae are of the same height (where the flash trim line does not vary in elevation for the distance of more than one lamella) the edges of such lamellae are juxtaposed, i.e. abut rather than overlap.

Obviously, because the lamellae are horizontal and have finite lengths, and because the flash trim line may and usually does widely vary in elevation and in rate of change of elevation, the elevational heights of the different lamellae will not precisely match the heights of the associated portions of the flash trim line to be cut thereby. However each lamella will approximately match the average elevational height of that section of the trim line which the lamella is to cut. Thereby in effect there is provided a three-dimensional cutting die which actually consists of a series of adjacent two-dimensional cutting dies (plane cutting dies) at successively different elevations.

FIGS. 4 and 5 show the assembled trimming die 109 as it appears when opened and with a yet untrimmed object 30 seated in the trimming die-nest. As the press closes (see FIG. 6) all of the lamellae will progressively trim scrap from the object along the flash trim line, each of the lamellae initially engaging the base of the flash at about the same time and each of the lamellae completing its trimming operation at about the same as all the other lamellae. Each performs an approximately equal length of trimming operation on the flash as all the other lamellae.

It will be obvious that despite the fact that the flash trimming operation consists of a plurality of two-dimensional trimming steps, since all of these steps start at the approximately same time and finish at approximately the same but later time there is no tendency to displace the object on the die-nest, i.e. the trimming forces are approximately balanced. Moreover because the trimming is progressive and at several points around the periphery of the object a press of comparatively small tonnage can be employed. Also the cost of making the die is very low since complex tool design is eliminated; precision lay-out is done away with because the trimming die is generated directly from the object to be trimmed; high precision machine tools and special skills are not required; the cost of materials is very low; and the tool can be built rapidly because it is made of simple small pieces (the lamellae). It also has been found that the trimming considerably lessens distortion or skewing of the object because the trimming is progressive and sub-divided rather than a direct blanking action. Furthermore, the use of plural lamellae which are parallel to one another and cut by a movement in a direction perpendicular to their planes greatly simplifies the fabrication of the tool and the resharpening of shearing edges, as well as replacement of any part of shearing edge that may fail.

It has been mentioned earlier herein that the trimming die-nest may conform to and thereby be enabled to supportingly engage either side of the object to be trimmed. The tool as thus far described utilizes a die-nest which matches the convex side of the object 30 so that the nest is concave. In FIG. 7 there is shown a trimming die-nest 110 which conforms to the concave side of the object 30 so that the operative surface of the die-nest is convex. Its side wall 112 is perpendicular to the reference surface 47.

Ocassionally a section of the flash to be trimmed either is approximately at the same level (parallel to the reference surface 47) for a substantial length or experiences a sharp change in elevation. Preferably under these extreme conditions, and only for the length of flash so configured, a guillotine cutter is employed instead of the horizontal plane lamallae. Such guillotine cutter 114 is illustrated in FIG. 8, the flash trimming die otherwise being the same as has been described heretofore. The guillotine cutter is conventional and comprises a thin metal blade which extends upwardly (perpendicular to the reference surface 47 of the die-nest 52) from its cutting edge 116 instead of horizontally, away from the cutting edge as in the case of the lamellae 86. Said guillotine blade is suitably secured to the upper die plate 58 at by means of a mounting block 118. The cutting edge of the guillotine blade is oriented at a slight angle to the horizontal, e.g. 10°, when it is used to cut a section of flash of substantial length which is at substantially the same elevation (parallel to the reference surface) so that the trimming of such flash will be progressive and will not be a blanking operation. When the section of flash to be cut experiences a sharp change in elevation, e.g. a flash which is almost vertical (almost parallel to the direction of movement A of the press ram 100) the shape of the cutting edge of the guillotine blade is of no importance as the cut will take place progressively due to the change in elevation of the flash to be trimmed. It particularly is to be pointed out that the use of the guillotine blade per se is no part of the present invention and the same is only useful when utilized in conjunction with the parallel plane lamellae located at progressively different elevations.

Customarily, molded and die cast objects with three-dimensional trim lines are of such configuration that the peripheral zones of the objects adjacent the flash is not at a steep inclination with respect to the flash, i.e. is inclined, if at all, at a mild angle to the plane of the flash and, accordingly, the peripheral edges of the trimming die-nest are sturdy. However, upon occasion, objects are die cast or molded in which the peripheral margin of the object or at least some portion thereof is at a steep angle e.g. within 45° of the vertical (direction of movement of the press ram) and, as a result, the peripheral zone of the trimming die-nest beneath said portion may be less sturdy than is desired. It will be appreciated that this zone of the trimming die-nest in effect acts as an anvil against which the flash is trimmed by the lamellae.

It will thus be seen that there are provided devices in which the several objects of this invention are achieved, and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention I claim as new and desire to secure by Letters Patent.

1. A die movable in a given direction for trimming cast or molded objects having a three-dimensional trim line, said die comprising plural plane lamellae parallel to one another and in successively different parallel planes that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement.

2. A die movable in a given direction for trimming cast or molded objects having a three-dimensional trim line, said die comprising plural plane lamellae parallel to one another and in successively different parallel planes that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement, and means to support the object during trimming.

3. A die movable in a given direction for trimming cast or molded objects having a three-dimensional trim line, said die comprising plural plane lamellae parallel to one another and in successively different parallel planes that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement and a die-nest to support the object during trimming.

4. A die movable in a given direction for trimming cast or molded objects having a three-dimensional trim line, said die comprising plural plane lamellae parallel to one another and in successively different parallel planes that are displaced from one another in a direction perpendicular to said planes, said lamellae being arranged in sequence to define a plane projected closed path the inner periphery of which matches the plane projection of the trim line, the heights of said lamellae in elevation approximately matching the elevational profile of the trim line, the planes of said lamellae being substantially perpendicular to said direction of movement.

5. A die movable in a given direction for trimming cast or molded objects having a three-dimensional trim line, said die comprising plural overlapping plane lamellae parallel to one another and in successively different parallel planes that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement.

6. A die movable in a given direction for trimming cast or molded objects having a three-dimensional trim line, said die comprising plural discrete plane lamellae parallel to one another and in successively different parallel planes, that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement.

7. A die movable in a given direction for trimming cast or molded objects having a three-dimensional trim line, said die comprising a die-plate, plural lamellae, means individually supporting said plane lamellae from said die plate parallel to one another and in successively different parallel planes, that are displaced from one another in a direction perpendicular to said planes, said lamellae being arranged in sequence to define a plnae projected path the inner periphery of which matches the plane projection of the trim line, the heights of said lamellae in elevation approximately matching the elevational profile of the trim line, the planes of said lamellae being substantially perpendicular to said direction of movement.

8. A die movable in a given direction for trimming cast or molded objects having a three-dimensional trim line, said die comprising an upper die-plate, plural plane lamallae, means individually supporting said lamellae from said die plate parallel to one another and in successively different parallel planes, that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement.

9. A die movable in a given direction for trimming cast or molded objects having a three-dimensional trim line, said die comprising plural plane lamellae parallel to one another and in successively different parallel planes, that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement, and a die-nest to support the object during trimming, the sides of the die-nest having a contour matching said plane projection of the trim line, the base of said die-nest being perpendicular to the sides of the die-nest.

10. A die movable in a given direction for trimming cast or molded objects having a three-dimensional trim line, said die comprising plural plane lamellae paralell to one another and in successively different parallel planes that are displaced from one another in a direction perpendicular to said planes, said lamellae being arranged in sequence to define a plane projected path the inner periphery of which matches the plane projection of the trim line, the heights of said lamellae in elevation approximately matching the elevational profile of the trim line, the planes of said lamellae being substantially perpendicular to said direction of movement, and a die-nest to support the object during trimming the sides of said die-nest having a contour matching said plane projection of the trim line.

References Cited in the file of this patent

UNITED STATES PATENTS

| | | |
|---|---|---|
| 1,685,513 | Wilber | Sept. 25, 1928 |
| 1,959,306 | Rosenberg | May 15, 1934 |
| 2,256,247 | Groehn | Sept. 16, 1941 |
| 2,378,562 | Lahr | June 19, 1945 |
| 2,411,016 | Azzara | Nov. 12, 1946 |
| 2,939,347 | Tobey | July 7, 1960 |
| 3,000,251 | Berlin | Sept. 19, 1961 |
| 3,012,451 | Kohler | Dec. 12, 1961 |

FOREIGN PATENTS

| | | |
|---|---|---|
| 410,907 | France | June 2, 1910 |
| 688,052 | Great Britain | Feb. 25, 1953 |